United States Patent
Xu et al.

(10) Patent No.: US 8,620,329 B2
(45) Date of Patent: Dec. 31, 2013

(54) METHOD AND APPARATUS FOR PERFORMING SWITCHING IN MOBILE COMMUNICATION SYSTEM

(75) Inventors: Lixiang Xu, Beijing (CN); Hong Wang, Beijing (CN); Xiaoqiang Li, Beijing (CN)

(73) Assignees: Samsung Electronics Co., Ltd (KR); Beijing Samsung Telecom R&D Center (CN)

( * ) Notice: Subject to any disclaimer, the term of this patent is extended or adjusted under 35 U.S.C. 154(b) by 225 days.

(21) Appl. No.: 13/060,212

(22) PCT Filed: Aug. 17, 2009

(86) PCT No.: PCT/KR2009/004586
§ 371 (c)(1),
(2), (4) Date: Feb. 22, 2011

(87) PCT Pub. No.: WO2010/021475
PCT Pub. Date: Feb. 25, 2010

(65) Prior Publication Data
US 2011/0151878 A1 Jun. 23, 2011

(30) Foreign Application Priority Data
Aug. 20, 2008 (CN) .......................... 2008 1 0211062

(51) Int. Cl.
*H04W 36/00* (2009.01)
(52) U.S. Cl.
USPC ........... 455/444; 455/436; 455/437; 455/438; 455/439; 455/440; 455/441; 455/442; 455/443
(58) Field of Classification Search
USPC ................................................ 455/436–444
See application file for complete search history.

(56) References Cited

U.S. PATENT DOCUMENTS

| 8,072,936 B2 * | 12/2011 | Shaheen ....................... 370/331 |
| 2007/0291695 A1 | 12/2007 | Sammour et al. |
| 2008/0267153 A1 * | 10/2008 | Mukherjee et al. ........... 370/338 |
| 2008/0268846 A1 * | 10/2008 | Shaheen ....................... 455/436 |
| 2009/0047955 A1 * | 2/2009 | Frenger et al. ................ 455/436 |
| 2009/0270096 A1 * | 10/2009 | Somasundaram et al. .... 455/434 |

FOREIGN PATENT DOCUMENTS

| EP | 1871126 | 12/2007 |
| WO | WO 2007103369 | 9/2007 |

OTHER PUBLICATIONS

PCT/ISA/237 Written Opinion issued on PCT/KR2009/004586 (3 pp.).
PCT/ISA/210 Search Report issued on PCT/KR2009/004586 (3 pp.).

* cited by examiner

*Primary Examiner* — Liton Miah
(74) *Attorney, Agent, or Firm* — The Farrell Law Firm, P.C.

(57) ABSTRACT

Disclosed is a method for performing switching between a macro evolved Node B (eNB) and a home eNB (HeNB) in a mobile communication system including broadcasting, by the HeNB, a length of an HeNB ID to a UE; notifying, by the UE, an HeNB indication information containing the length of the HeNB ID to the macro eNB; transmitting, by the macro eNB, a switching request message to a mobile station mobility management entity, the message including a target ID; finding, by the MME, the HeNB or an HeNB gateway according to the target ID, and performing a switching process from the macro eNB to the HeNB. With the described switching method for the mobile communication system, UE can move between the macro eNB and the HeNB.

12 Claims, 13 Drawing Sheets

METHOD AND APPARATUS FOR PERFORMING SWITCHING IN MOBILE COMMUNICATION SYSTEM

PRIORITY

This application claims priority under 35 U.S.C. §119(a) to a Chinese Patent Application filed Aug. 20, 2008, assigned Serial No. 200810211062.1, and to PCT/KR2009/004586 filed Aug. 17, 2009, the disclosure of each of which is hereby incorporated by reference.

BACKGROUND OF THE INVENTION

1. Field of the Invention

The present invention relates to mobile communications, especially to a method and an apparatus for performing switching in a mobile communication system.

2. Description of the Related Art

An existing structure of the 3rd Generation Mobile Communication System Partnership Project (3GPP) is shown in FIG. 1.

User Equipment 101 (UE) is a mobile terminal device used to receive data. Node B 102 is a node for radio receiving/transmitting in an Radio Network Subsystem (RNS). Control Radio Network Controller 103 (CRNC) is a radio network controller that controls Node B directly. An interface between a radio network controller (RNC) and the UE is provided via an wireless interface. A Serving Radio Network Controller 104 (SRNC) is used as the RNC to control bearer information such as a Radio Resource Control (RRC) information. The interface between SRNC and CRNC is an Iur interface. Gateway General Packet Radio Service (with General Packet Radio Service referred to as GPRS) Supporting Node 106 (with Gateway GPRS Supporting Node referred to as GGSN) and Service GPRS Supporting Node 105 (SGSN) provide routing for data transmission. An interface between SGSN and RNC is a Iu interface. An External Public Data Network (E-PDN) 107 for providing data resources.

A system structure of Service Architecture Evolution (SAE) is illustrated in FIG. 2. Referring to FIG. 2, UE 201 is a terminal device used to receive data. EUTRAN 202, also called evolved Node B (eNB), is a radio access network of the LTE SAE, for providing an interface through which a Long Term Evolution (LTE) mobile station will access the radio network. Through the interface S1, eNB 202 connects to the mobile station Mobility Management Entity (MME) 203 and the user plane entity Serving Gateway (Serving GW) 204. MME 203 is used for managing a mobile context and a session context for the UE, and saving user security information. Serving GW 204 primarily provides a function of user plane for delivering information from user. An interface S1-MME is used for establishing radio access bearer for UE and forwarding messages from the UE 201 to the MME 203 through a wireless access network. The combined function of MME 203 and Serving GW 204 is similar to that of the original SGSN 206. Both the MME and the Serving Gateway can be located at the same physical entity. Public Data Network (PDN) Gateway 205 is used for functions like accounting, legal monitoring, etc. Both the Serving Gateway and the PDN Gateway can be located at the same physical entity. SGSN 206 provides routing for data transmission for existing Universal Mobile Telephone Service (UMTS). The existing SGSN finds a corresponding GGSN according to an Access Point Name (APN). A Home Subscription Sub-system (HSS) 207 is provided for the UE, for storing user information that includes a current location of the UE, an address of the serving node, security related information for the user, and an activated Packet Data Protocol (PDP) context for the UE. Policy and Charging Rules Function (PCRF) 208 provides a Quality of Service (QoS) policy and accounting rules through an interface S7.

In general, a user data stream arrives at the Serving GW 204 through PDN Gateway 205. Then, through the GPRS Tunnel Protocol (GTP) channel, data is transmitted by the Serving Gateway to the eNB where the UE locates, and transmitted by the eNB to a corresponding UE.

FIG. 3 shows a structure of interface S1 in SAE, where Evolved Packet Core (EPC) is the LTE core network. Here, each eNB 301 connects with several MMEs 312 in the MME pool. Each eNB 301 also connects to several S-GWs 311 in the S-GW Pool.

A Home Network B (HNB), which includes 3G HNB, LTE HNB and HNBs for the other access systems, refers to a Node B applied in a home. It also can be applied in sites such as a university, a company and so on. HNB is Plug-and-Play. HNB includes an open-typed HNB and the close user group-typed HNB. A difference between the close user group-typed HNB and a common macro eNB lies in that usually not all UE can access the HNB. For example, only the UEs in the home of a user or other UEs specifically allowed to access the HNB can access the corresponding HNB. For the HNB in a company, only a company's staff and allowed partners can access the HNB. The HNB group, for example, an HNB in a company, bearing the same access subscriber cluster is called a Closed Subscriber Group (CSG).

The structure of the 3G HNB is illustrated in FIG. 4. A UTRAN 400 includes a 3G HNB 401 and a 3G HNB GW 402. The HNB and the HNB GW form an HNB RAN. 3G HNB performs the functions of original NodeB and some functions of RNC, such as RRC, RLC, MAC, etc. The 3G HNB GW is a node connecting to the core network, including a function of NAS Node Selection Function (NNSF). The interface between HNB and HNB GW is the Iuh interface. 3G HNB GW accesses the core network through the Iu interface.

No conclusion is made on the structure of LTE HNB (HeNB). A solution is that MME and S-GW are directly connected to the HeNB. Another solution is that a structure similar to 3G HNB, and HeNB accesses the core network through the HeNB GW.

When UE switches between eNBs, an existing MME relocation process is illustrated in FIGS. 5A and 5B. If no relocation is performed by the Serving GW, the source Serving GW in FIG. 5A functions as a target Serving GW.

In step 501, the source eNB 520 decides to initiate an S1 switching process. This process can be triggered when no X2 interface exists between the source eNB 520 and the target eNB 530, triggered by an error indication from the target eNB 530 when an unsuccessful X2 switch is performed, or triggered by the dynamic information obtained by the source eNB 520.

In step 502, the source eNB 520 transmits a "Switching Request" message to the source MME 540. The message includes an indicator indicating whether data can be directly forwarded between the source eNB 520 and the target eNB 530. The "Switching Request" message includes message elements of:

MME UE S1AP ID (MME UE S1 application layer identifier).

eNB UE S1AP ID (eNB UE S1 application layer identifier).

Switch type, including IntraLTE (within LTE), LTE to UTRAN (from LTE to UTRAN), LTE to GERAN (from LTE to GERAN).

Cause for switching.

Source ID. The same method for setting the source ID can be applied in the configuration of both the source ID and the target ID. For example, the ID may include a TAI (Tracking Area Identity) and a unique eNB ID in a Public Land Mobile Network (PLMN), i.e. a global land mobile network, or a PLMN ID, which is a unique eNB ID and the MME group ID under PLMN.

Target ID, which can be either the PLMN ID or the unique eNB ID under PLMN. For the sake of routing between MMEs, the target ID can also include the TAI and the MME group ID. If the TAI is included for the sake of routing between different MMEs, the target ID includes the TAI and the unique eNB ID under PLMN, since the TAI has already contained the PLMN ID.

Availability on direct data forwarding.

Intra-LTE-switch information list request, which is enabled when there happens IntraLTE switching, and includes a transparent container from the source eNB to the target eNB.

LTE-UTRAN-switching information list request, which is enabled when LTE to UTRAN switching occurs.

LTE-GERAN-switch information list request, which is enabled when LTE to GERAN switching occurs.

In step 503, the source MME 540 selects a target MME 550 and transmits a "Forward relocation request" message. Detailed description on MME selecting is omitted here for conciseness. The "forward relocation request" message includes the MME UE context. The MME UE context includes a PDN GW 580 address and TEIDs for uplink data transmission, which corresponds to the interfaces S5 and S8 of GTP, and a Serving GW address and TEIDs for uplink data transmission. The message also includes an indicator indicating whether data can be forwarded directly or any bearer has been established in the source side for indirect data forwarding. The message further includes a switching type, a switching cause, and a container from source eNB 520 to target eNB 530 since it is the switching inside the LTE.

In step 504, the target MME 550 verifies whether the source Serving GW 560 can still serve the UE 500. If not, the target MME 550 selects a new Serving GW, a detailed description of which is omitted here for conciseness. The target MME 550 transmits an "establishing bearer request" message to the target Serving GW 570. If the source Serving GW 560 still serves for the UE 500, it also acts as the target Serving GW. In this case, the message in this step is not necessary. The "establishing bearer request" message includes a bearer context, such as the PDN GW address and the TEIDs, which corresponds to interfaces S5 and S8 of GTP. The target Serving GW allocates the S-GW address and TEIDs for uplink data transmission through interface S1.

In step 504A, the target Serving GW 570 transmits an "establishing bearer response" message to the target MME 550. This message includes a Serving GW address and uplink TEIDs.

In step 505, the target MME 550 transmits a "switching request" message to the target eNB 530. This message includes the Serving GW address and the uplink TEIDs. After the target eNB 530 receives this message, it establishes the UE context including the bearer and the security context. In the message, the switch type is set as IntraLTE. The "switching request" message includes information elements of: MME UE S1AP ID (MME UE S1 application layer identifier); Switch type, including IntraLTE (within LTE), LTE to UTRAN (from LTE to UTRAN), LTE to GERAN (from LTE to GERAN); Cause for switching; SAE bearer list to be established; intra-LTE-switch (within LTE) information list request, which is enabled when there happens IntraLTE switching, and includes the transparent container from the source eNB to the target eNB; UTRAN-to-LTE switching information list request, which is enabled when there happens UTRAN to LTE switching; GERAN-to-LTE switch information list request, which is enabled when there happens GERAN to LTE; a serving PLMN; and a switching constraint list.

In step 505A, the target eNB 530 transmits a "switching request ACK" message to the target MME 550. The message includes the address and the TEIDs allocated by the target eNB 530 for downlink data transmission through interface S1.

In step 506, if an indirect data forwarding mode is applied here, the target MME 550 specifies forwarding parameters for the target Serving GW 570.

In step 507, the target MME 550 transmits a "forwarding relocation response" message to the source MME 540. The message includes an indicator indicating whether any change takes place in the Serving GW. If a change does take place, a new Serving GW is indicated. If the indirect data forwarding mode is applied here, the message also includes the Serving GW address and the TEIDs for data forwarding.

In step 508, if the indirect data forwarding mode is applied here, the source MME 540 updates the source Serving GW's channel for data forwarding. If the Serving GW has been relocated, the "establishing bearer request" message also includes an index of the channel between the source and the target Serving GWs.

In step 509, the source MME 540 transmits a "switching command" message to the source eNB 520. The message includes a target address and TEIDs allocated by eNB for data forwarding. The switch command includes the information elements of: an MME UE S1AP ID, i.e. MME UE S1 application layer identifier; an eNB UE S1AP ID, i.e. eNB UE S1 application layer identifier; a Switch type, including IntraLTE (within LTE), LTE to UTRAN (from LTE to UTRAN), LTE to GERAN (from LTE to GERAN); a bearer list for data forwarding; an SAE bearer list to be released; an Intra-LTE-switch (within LTE) information list request, which is enabled when there happens IntraLTE switching, and includes the transparent container from the source eNB to the target eNB; an LTE-UTRAN-switching information list request, which is enabled when LTE to UTRAN switching occurs; and an LTE-GERAN-switch information list request, which is enabled when there happens LTE to GERAN.

In step 510, the source eNB 520 transmits the "switching command" message to UE. This message includes information on radio resource configuration of the target cell.

In step 511A, for the bearer for data forwarding, the source eNB 520 begins to forward downlink data to the target eNB 540. Here, either a direct data forwarding mode (step 511A) or the indirect data forwarding mode (step 511B) can be applied here.

As shown in FIG. 5B, in step 512, after UE 500 is synchronized to the target cell, the UE 500 transmits a "switching ACK" message to the target eNB 530. The target eNB 530 can transmit the forwarded downlink data to UE 500. Similarly, the UE 500 can transmit the uplink data.

In step 513, the target eNB 530 transmits a "switching notification" message to the target MME.

In step 514, the target MME 550 transmits a "forwarding relocation complete" message to the source MME 540. The source MME 540 transmits a "relocation complete ACK" message to the target MME 550.

In step 515, the target MME 550 transmits an "updating bearer request" message to the target Serving GW 570. The message includes an eNB address and the TEIDs allocated by the target eNB 530 for downlink data transmission through interface S1, and the PDN GW address and the TEIDs for uplink data transmission (this case corresponds to the interfaces S5 and S8 of GTP).

In step 516, if the Serving GW is relocated, the target Serving GW 570 allocates addresses and TEIDs to PDN GW 580 for downlink data transmission. The target Serving GW 570 transmits the "updating bearer request" message to PDN GW 580. The message includes the Serving GW address and the TEIDs.

In step 516B, PDN GW 580 updates the context information and transmits an "updating bearer response" message to the target Serving GW 570. PDN GW 580 begins to transmit downlink data to the target Serving GW 570. If the Serving GW has not yet been relocated, the message in this step is not necessary. Serving GW directly transmits data to the target eNB 530.

In step 517, the target Serving GW 570 transmits the "updating bearer response" message to the target MME 550. This message includes the PDN GW address and the TEIDs corresponding to interfaces S5 and S8 of GTP.

In step 518, UE 500 initializes a Track-Area-Updating (TAU) process, regarding which a detailed technical description is omitted here for conciseness. The target ID in the "switching request" message of step 502 of FIG. 5A facilitates the MME to obtain a downstream node, e.g., the HeNB or HeNB GW.

However, a length of the HeNB ID or the HeNB GW ID possibly differs from that of the macro eNB, and the information on adjacent HeNBs is not saved in the macro eNB. When the target cell is a CSG cell, the manner of making the macro eNB learn about the eNB type or eNB ID of the target cell will not be solved. Thus, the process of switching from a macro eNB to an HeNB can not be implemented.

SUMMARY OF THE INVENTION

The invention provides a method and an apparatus for performing switching in a mobile communication system.

According to an aspect of the present invention, a method for performing switching between a macro eNB and an HeNB in a mobile communication system is provided that includes broadcasting, by the HeNB, a length of an HeNB ID to a UE; notifying, by the UE, an HeNB indication information containing a length of the HeNB ID to the macro eNB; transmitting, by the macro eNB, a switching request message to a MME, the message including a target ID; and finding, by the MME, the HeNB or an HeNB GW according to the target ID, and performing a switching process from the macro eNB to the HeNB.

According to another aspect of the present invention, an apparatus is provided for performing switching in a mobile communication system, the apparatus including: an HeNB broadcasting a length of an HeNB ID to a UE; a macro eNB receiving an HeNB indication information containing the length of the HeNB ID from the UE, transmitting a switching request message including a target ID; and a MME receiving the switching request message from the macro eNB, finding the HeNB or an HeNB GW according to the target ID, and transmitting the switching request message to the HeNB or the HeNB GW.

With the switching method proposed in present invention for the mobile communication system, UE can move between the macro eNB and the HeNB.

BRIEF DESCRIPTION OF THE DRAWINGS

The objects, features, and advantages of the present invention will be more apparent from the following detailed description taken in conjunction with the accompanying drawings, in which.

DETAILED DESCRIPTION OF PREFERRED EMBODIMENTS

Herein, various embodiments of the present invention will be described in detail with reference to the accompanying drawings. In the following description, a detailed description of known functions and configurations incorporated herein will be omitted to avoid obscuring the subject matter of the present invention.

In the following, an LTE system is taken as an example for description. The method proposed in present invention can also be applied in HeNB of any other access system. The case in which a UE moves from a macro eNB to a HeNB is taken as an example for description. The method proposed in present invention is also suitable when the UE moves from one HeNB to another HeNB.

On condition that the access system has different types of access network node equipment, and the lengths of the IDs of the different types of access network node equipments are different, the method proposed in present invention can be normally operated.

Figure 1:
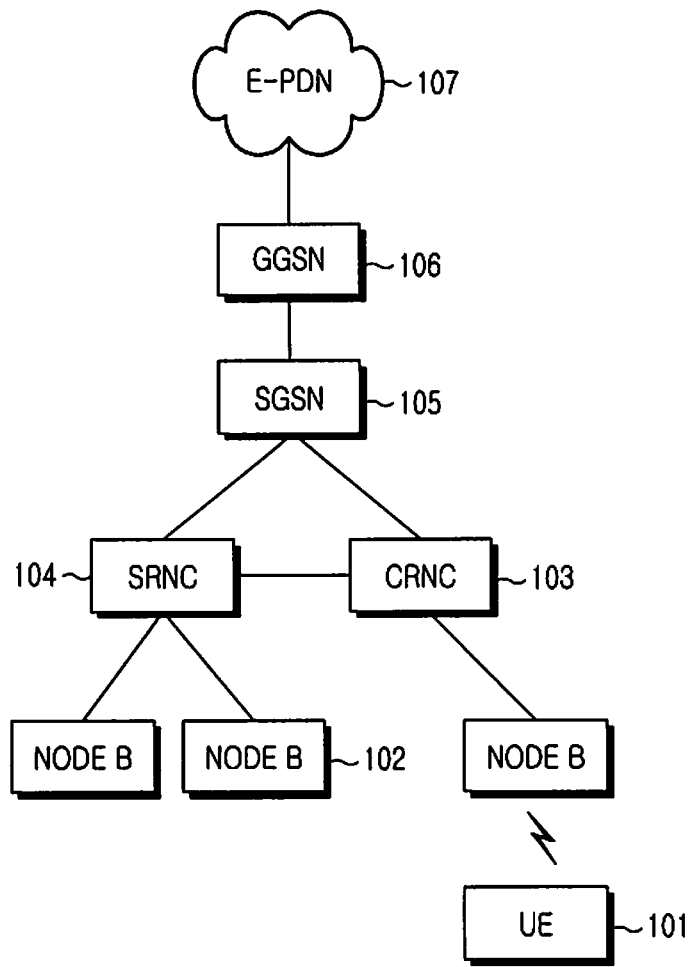
FIG. 1 shows a structure of an existing 3GPP system.
Figure 2:
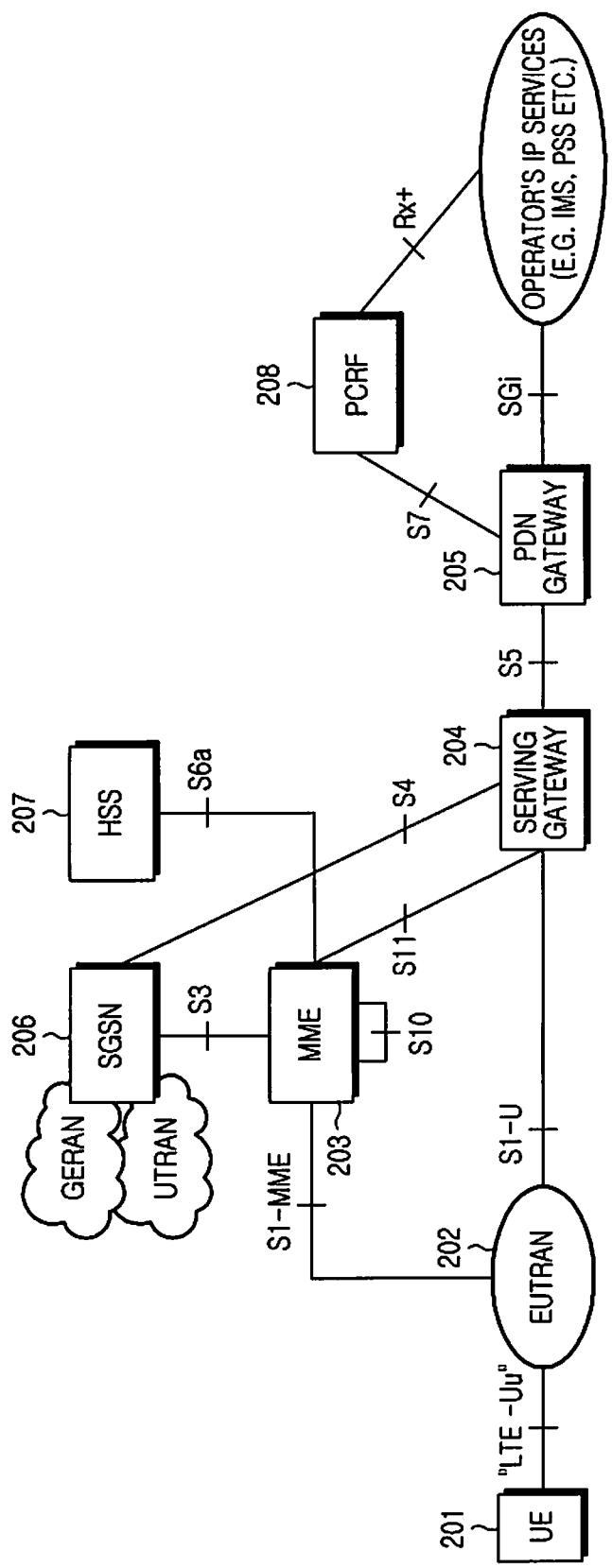
FIG. 2 shows a structure of a SAE system network.
Figure 3:
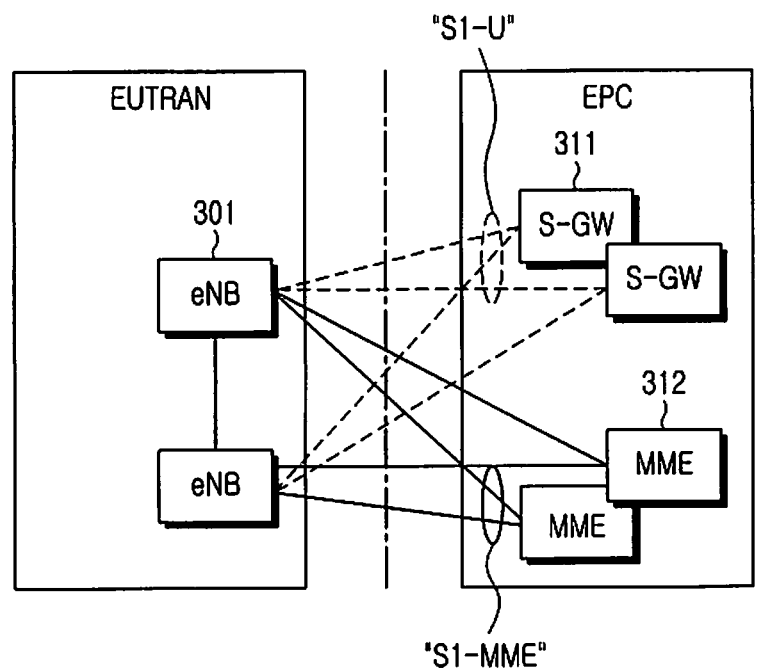
FIG. 3 shows a structure of an interface S1.
Figure 4:
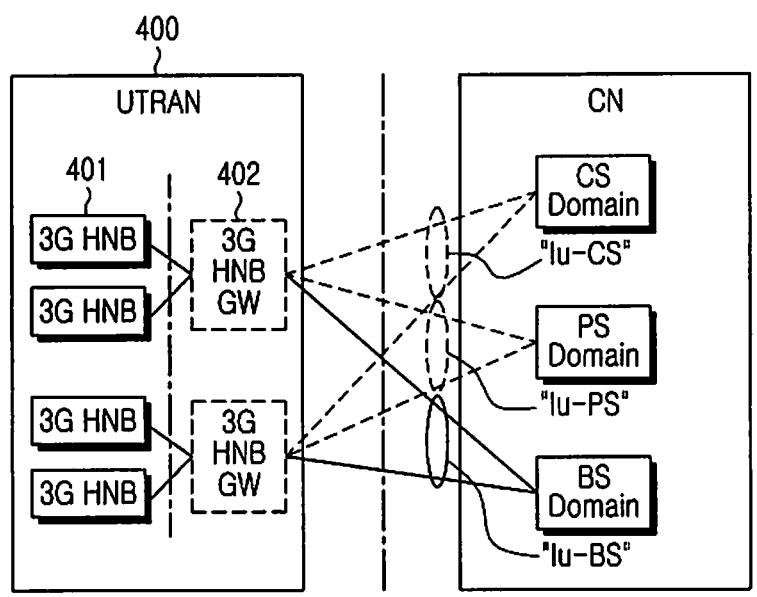
FIG. 4 shows a structure of a 3G HNB.
Figure 5A:
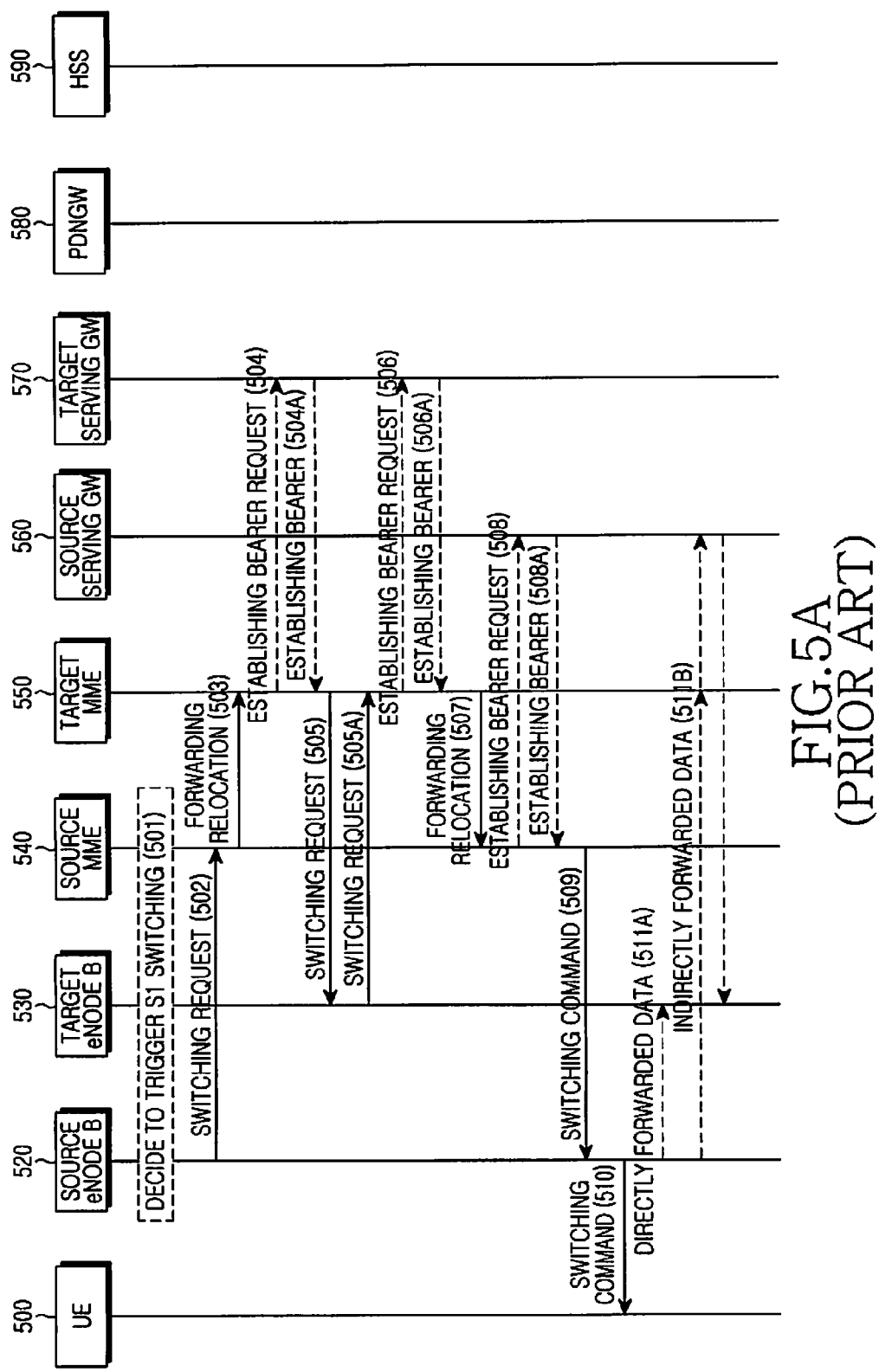
FIGS. 5A and 5B provide a flow diagram of an MME relocation process when the UE switches between eNBs.
Figure 5B:
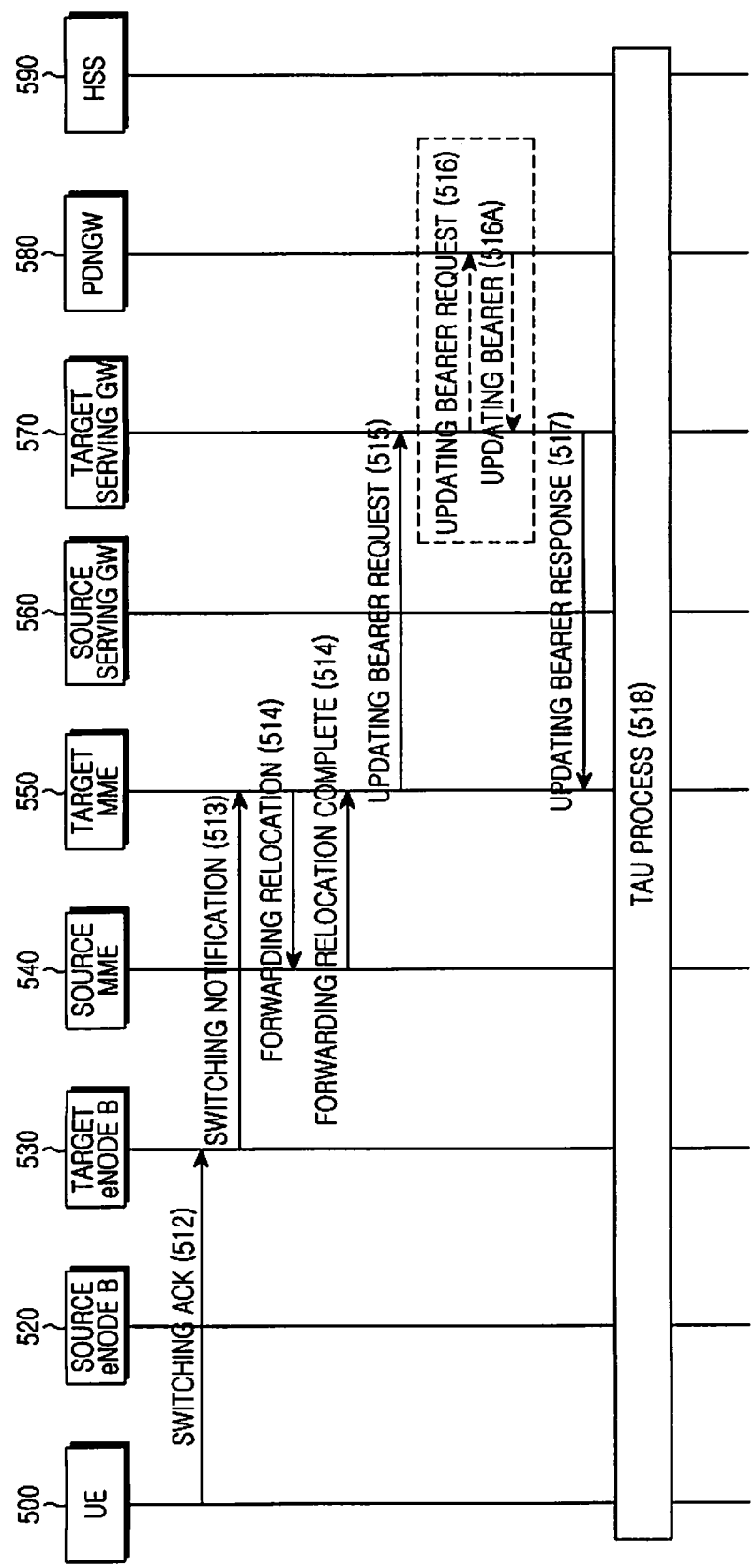
Figure 6:
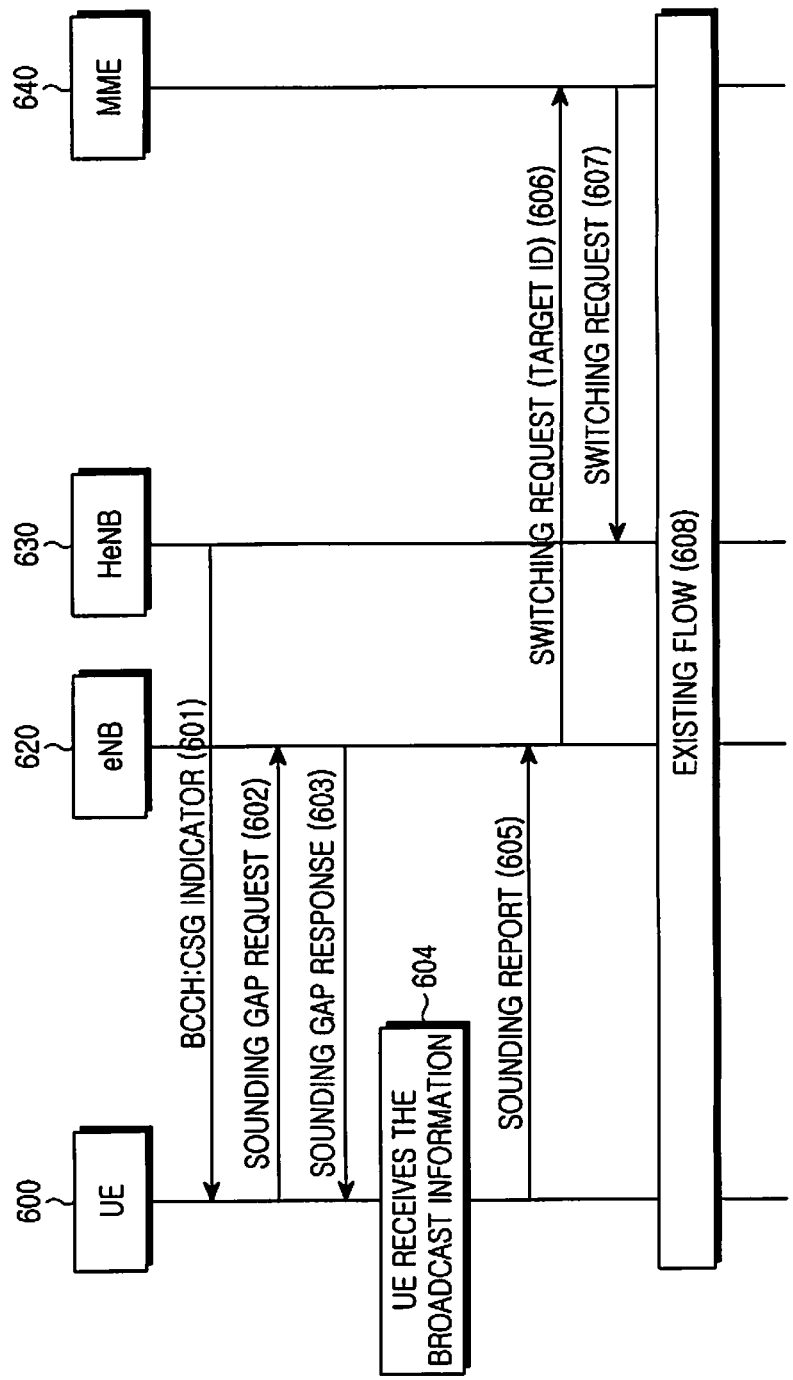
FIG. 6 shows a first embodiment of a method for performing S1 switching with that HeNB directly accessing the core network.

FIG. 6 shows a first embodiment that performs S1 switching. In this embodiment, no HeNB GW exists in the HeNB structure. The length of HeNB ID can be the same (e.g., 28-bit) or be different.

In step 601 of FIG. 6, HeNB 630 transmits an indicator through BCCH, indicating that it is a HeNB. At present, disagreement remains on HeNB classification. However, the agreement that the eNB applied in a home is a HeNB can be reached. Some companies consider the eNB applied in a small company as a HeNB, and some consider the eNB as a macro eNB with the function of close-user-cluster. The eNB applied in a shop or restaurant can be either an open HeNB or a macro eNB, e.g., a pico eNB. If an open eNB, e.g., as applied in a shop or restaurant, is a macro eNB, the eNB bears the same ID length as that of a macro eNB. The indication function of HeNB can then also be realized by CSG, i.e., what HeNB 630 needs to do is to transmit a CSG indicator through BCCH. In this case, HeNB and CSG are consistent.

If the eNB in a shop or restaurant is a HeNB with a CSG function, it is necessary for HeNB to transmit the HeNB indicator through BCCH, indicating that it is a HeNB. If the eNB in a small company functions as a macro eNB with CSG function, which in this case the eNB shares the same ID length with the macro eNB, some overlap exists between the concept of CSG and that of HeNB. In this case, it is also necessary to transmit separate HeNB indicator through BCCH. Therefore, the indication of HeNB can be realized by CSG indicator or individual information element, depending on the application scenario for the HeNB and the definition of the HeNB.

In step 602, UE 600 moves to an area close to its HeNB 630, and requests a sounding gap from the macro eNB. UE 600 transmits a "sounding gap request" message to the macro eNB 620. According to footprint information, UE 600 detects arrival at the area close to its HeNB 630. For example, UE 600 arrives at the macro cell where the HeNB 630 is located, or UE 600 arrives at the TA of the macro cell where the HeNB 630 is located. In this case, it will be confirmed that UE 600 arrives at the area close to its HeNB 630.

In step 603, the macro eNB 620 transmits a "sounding gap response" message to UE 600. It includes a sounding gap allocated to UE 600.

In step 604, UE 600 receives the broadcast information from HeNB 630.

In step 605, UE 600 transmits a sounding report to the macro eNB 620. In this message, the cell information corresponding to the HeNB 630 includes the HeNB indicator and the CGI, the global cell identifier. CGI includes the PLMN, i.e. the global land mobile network, identifier and the unique Cell Identifier (CI) under PLMN. The message also includes a TAI where HeNB cell is located. The CI includes the eNB ID and the cell ID for the eNB. For a CSG, the CI includes the HeNB ID and the cell ID of the HeNB. For a typical HeNB, e.g. applied in a home, the CI can equal the HeNB ID, with a HeNB having only one cell. All these concepts are suitable for following embodiments.

The message can also include a CGI, a TAI and a sounding result for the UE 600.

The macro eNB 620 determines whether to performing switching according to the sounding result for the UE. If the macro eNB 620 determines to switch UE 600 to the HeNB cell, in step 606, the macro eNB 620 transmits the "switching request" message to MME 640. If the switching is implemented between different MMEs, the MME is a source MME. When a length of the HeNB ID is unique, the Target ID in the message includes a PLMN ID and a unique HeNB ID under PLMN. According to the CI in the CGI reported from UE and the length of the HeNB ID, the macro eNB finds the HeNB ID (viz., the first n bits in CI where n refers to the length of HeNB ID). When switching between different MMEs, the source MME transmits the "forwarding relocation request" message to the target MME after receiving the "switching request" message. In subsequent embodiments, the way the source MME finds the target MME will be given. When switching between different MMEs, the MME mentioned later in the present embodiment refers to the target MME. With the "S1 establishment request" message, MME 640 obtains the HeNB ID to which it connects during the process of establishing S1. MME 640 finds the target HeNB according to the PLMN ID and the HeNB ID.

When a HeNB 630 has two lengths of IDs, if UE 600 hopes to switch to the HeNB 630, the Target ID in the "switching request" message includes the PLMN ID and the identifier CI for the target cell. According to the length of the target ID, MME knows that the target eNB is not a macro eNB. And according to the length of the HeNB ID, MME extracts the target HeNB ID out from CI. For example, the HeNB ID is 24-bit or 28-bit in length. The value of the first 24 bits in the 28-bit long HeNB ID is different from that of the 24-bit HeNB ID. Therefore, MME respectively determines the matched 24-bit HeNB ID or 28-bit HeNB ID. Or according to the first 24 bits, the MME knows to which category the HeNB ID length belongs. Then, the MME obtains the target HeNB ID from CI according to the length of the HeNB ID. The MME finds the target eNB according the PLMN ID and the target HeNB ID.

In step 607, MME 640 transmits the "switching request" message to the HeNB 630.

In step 608, subsequent operation flow of S1 switching is the same as that in existing technique, with a detailed technical description omitted for conciseness.

Figure 7:
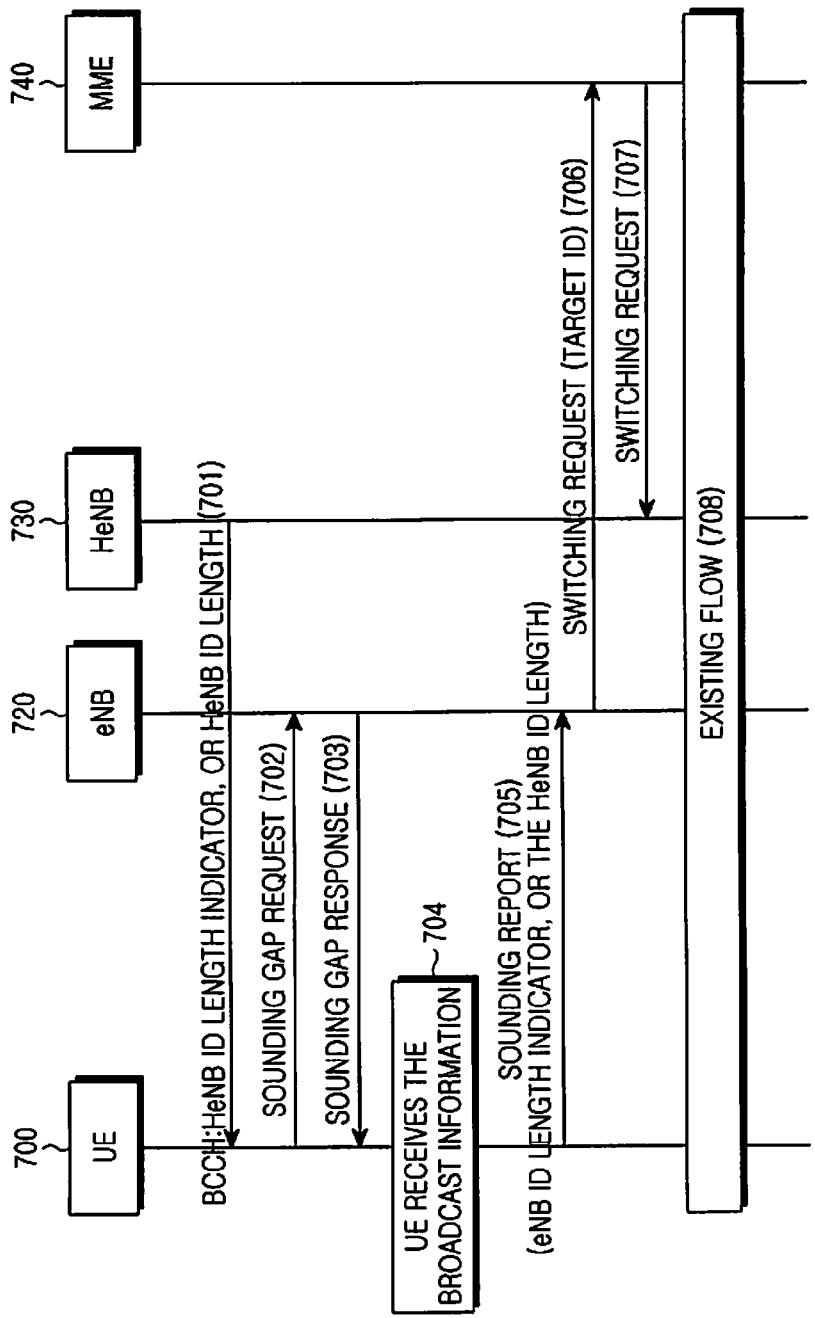
FIG. 7 shows a second embodiment of a method for performing S1 switching with the HeNB directly accessing the core network.

FIG. 7 shows a second embodiment for performing S1 switching, corresponds to the case that no HeNB GW exists in the structure of HeNB, with a detailed description provided below.

In step 701, HeNB 730 transmits the indicator of the HeNB ID length or the net HeNB ID length through BCCH. For example, if the length of the HeNB ID can be 22, or 25 or 28, the numbers 0, 1 and 2 can be adopted to indicate the length of 22, 25 and 28, respectively. If the HeNB ID is 24 or 28 bits long, numbers 0 and 1 can be adopted to indicate the length of 24 and the length of 28, respectively.

In step 702, UE 700 moves to the area close to its HeNB 730, it requests a sounding gap from the macro eNB 720. UE 700 transmits the "sounding gap request" message to the macro eNB 720. According to the footprint information, UE 700 knows when it arrives at the area close to its HeNB 730. For example, UE 700 arrives at the macro cell where the HeNB 730 is located, or UE 700 arrives at the TA of the macro cell where the HeNB 730 is located. In this case, it will be confirmed that the UE 700 arrives at the area close to its HeNB 730.

In step 703, the macro eNB 720 transmits the "sounding gap response" message to UE 700, including the sounding gap allocated to UE 700.

In step 704, UE 700 receives the broadcast information from HeNB 730.

In step 705, UE 700 transmits a sounding report to the macro eNB 720, including the HeNB ID length indicator or the net HeNB ID length. The message can also include CGI, TAI and the UEs sounding result.

The macro eNB 720 determines whether to perform switching according to the sounding result for the UE 700. If the macro eNB 720 determines to switch UE 700 to the HeNB cell, in step 706, it transmits the "switching request" message to MME 740, if the switching is implemented between different MMEs, the MME is a source MME. The macro eNB 720 includes the PLMN ID and the HeNB ID in the target ID in the message. The macro eNB 720 extracts the target HeNB ID from CI (viz., the first n bits where n refers to the length of HeNB ID), which includes the PLMN ID and CI, according to the HeNB ID length indicator or the net HeNB ID length reported by UE 700.

When switching between different MMEs, the source MME transmits the "forwarding relocation request" message to the target MME after receiving the "switching request" message. In subsequent embodiments, the way in which the source MME finds the target MME will be given. When switching between different MMEs, the MME mentioned later in present embodiment refers to the target MME. With the "S1 establishment request" message, MME 740 obtains the ID of the HeNB 730 to which it connects during the process of establishing S1. MME 740 finds the target HeNB according to the HeNB ID.

In step 707, MME 740 transmits the "switching request" message to the HeNB.

In step 708, subsequent operation flow of S1 switching is the same as that in existing technique, and a detailed technical description is omitted here for conciseness.

Figure 8:
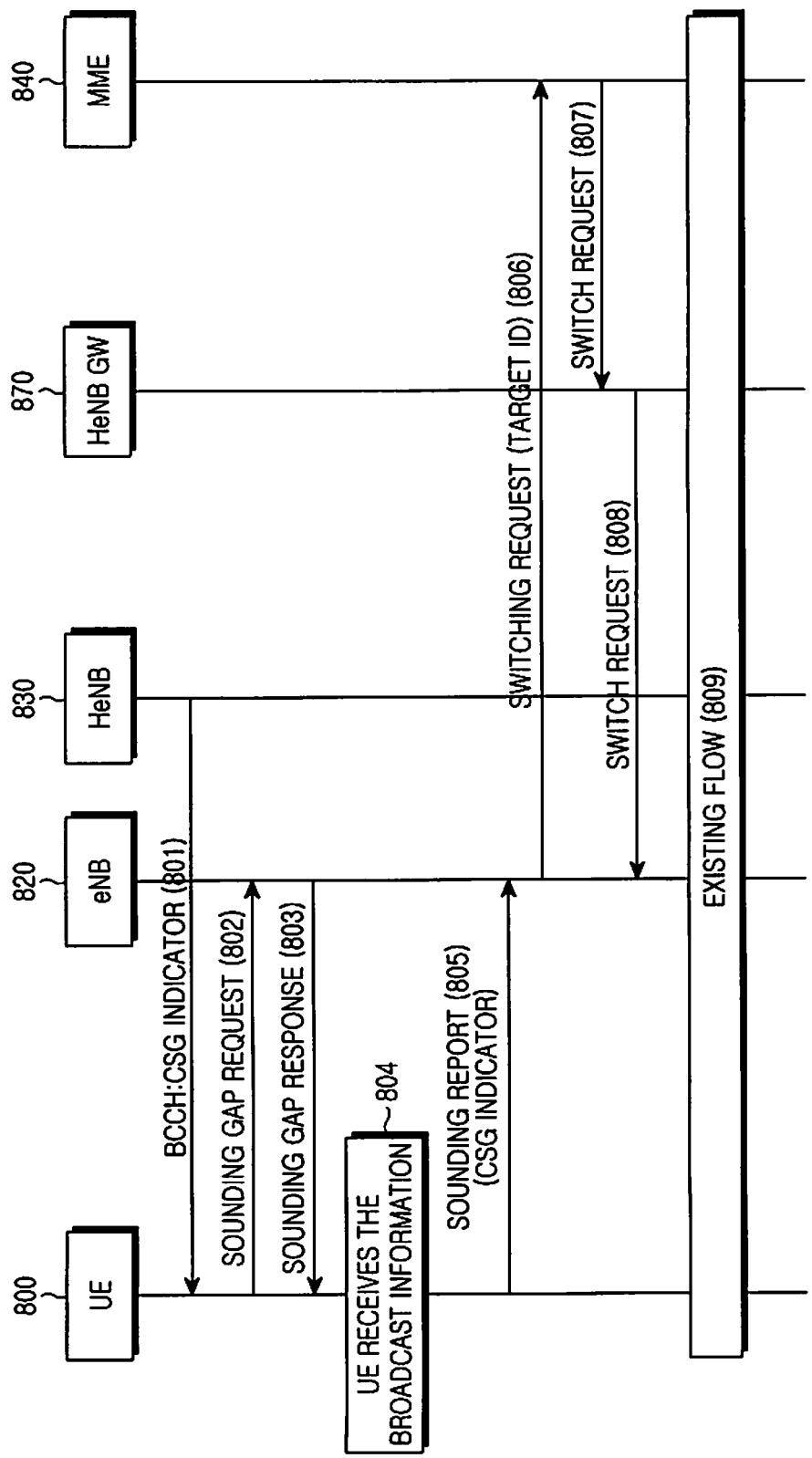
FIG. 8 shows a third embodiment of a method for performing S1 switching with the HeNB accessing a core network through HeNB GW.

FIG. 8 shows a third embodiment for performing S1 switching, corresponding to an HeNB consists of HeNB GW, which has fixed length, with a, detailed description provided below.

In step 801, HeNB 830 transmits the HeNB indicator through BCCH, indicating that it is an HeNB. At discussed above, some disagreement remains on HeNB classification. This disagreement is discussed above and is not repeated here for conciseness.

In step 802, UE 800 moves to the area close to its HeNB 830 and requests the macro eNB for a sounding gap. UE 800 transmits the "sounding gap request" message to the macro eNB 820. And according to footprint information, UE 800 knows that it arrives at the area close to its HeNB 830. For example, UE 800 arrives at the macro cell where the HeNB 830 is located, or UE 800 arrives at the TA of the macro cell where the HeNB 830 is located. In this case, it will be confirmed that UE 800 arrives at the area close to its HeNB 830.

In step 803, the macro eNB 820 transmits the "sounding gap response" message to UE 800. This message includes the sounding gap allocated to UE 800.

In step 804, UE 800 receives the broadcast information from HeNB 830.

In step 805, UE 800 transmits a sounding report to the macro eNB 820. In this message, the cell information corresponding to the HeNB 830 includes the HeNB indicator or the CSG indicator, CGI and the sounding result for the UE. The message further includes the identifier of the TA where the HeNB cell is located.

The macro eNB 820 determines whether to perform switching according to the sounding result for the UE. If the macro eNB 820 determines to switch UE 800 to the HeNB cell, in step 806, it transmits the "switching request" message to MME 840, and if the switching is implemented between different MMEs, the MME is a source MME. The macro eNB 820 includes the PLMN ID and the unique HeNB GW ID in the information element Target ID in the message. HeNB GW ID is included in CI. The macro eNB 820 obtains the HeNB GW ID by extracting corresponding number of bits (viz., the first n bits in CI where n refers to the length of HeNB GW ID) according to the length of the HeNB GW ID. When switching between different MMEs, the source MME transmits the "forwarding relocation request" message to the target MME after receiving the "switching request" message. In subsequent embodiments, the manner for the source MME finding the target MME will be given. When switching between different MMEs, the MME mentioned later in present embodiment refers to the target MME. With the "S1 establishment request" message, MME 840 obtains the HeNB GW IDs of all HeNB GWs to which it connects during the process of establishing S1. MME 840 finds the target HeNB GW according to the HeNB GW ID. The container of transparent transmission from source eNB to target eNB in the "switching request" message includes the target cell's CGI or CI.

In step 807, MME 840 transmits the "switching request" message to HeNB GW 870.

In step 808, HeNB GW 870 finds the HeNB 830 according to the CGI or CI in the container of transparent transmission from source eNB to target eNB. The ID for the HeNB serving cell can be allocated by HeNB GW 870. Then, it is transmitted from HeNB GW 870 to HeNB 830 with the HeNB registration process or an S1-h establishing process, as described in regard to FIG. 10. The ID for the HeNB serving cell can also be allocated by the operation and maintenance center. It is transmitted from HeNB 830 to HeNB GW 870 with the S1-h establishing process. The method for HeNB GW 870 to obtain the ID for the HeNB cell from HeNB 830 is illustrated in FIG. 9.

In step 809, subsequent operation flow of S1 switching is the same as that in existing technique, with a detailed technical description omitted here for conciseness.

Figure 9:
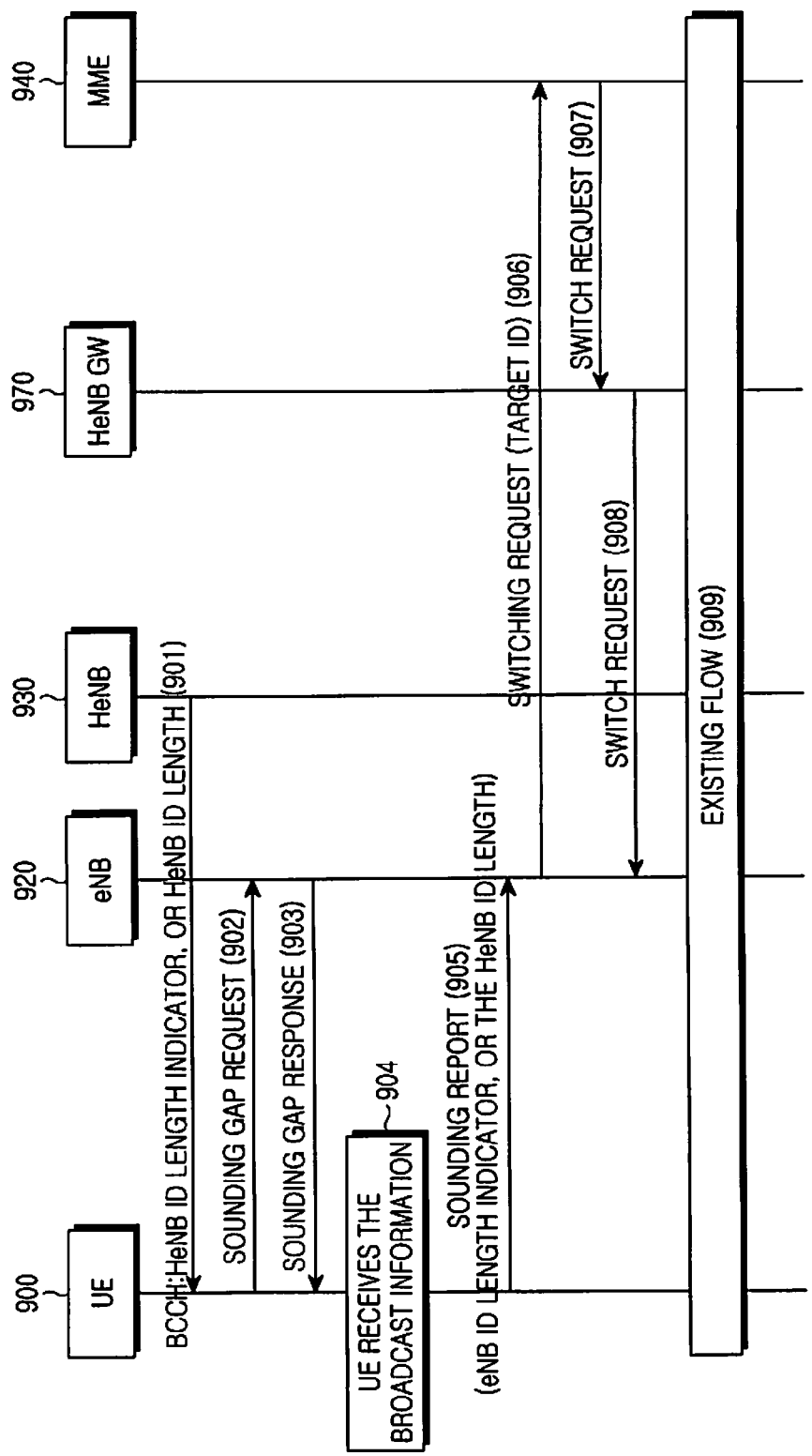
FIG. 9 shows a fourth embodiment of a method for performing S1 switching with the HeNB accessing a core network through HeNB GW.

FIG. 9 shows a fourth embodiment for performing S1 switching. This embodiment corresponds to the case that HeNB consists of HeNB GW, further to the following detailed description.

In step 901, HeNB 920 transmits the indicator of the HeNB ID length or the length of the HeNB ID through BCCH. For example, if the length of the HeNB ID can be 22, or 25 or 28, the numbers 0, 1 and 2 can be adopted to indicate the length of 22, 25 and 28, respectively.

In step 902, UE 900 moves to the area close to its HeNB 930, it requests a sounding gap from macro eNB 920. UE 900 transmits the "sounding gap request" message to the macro eNB 920. According to the footprint information, UE 900 knows that it arrives at the area close to its HeNB 930. For example, UE 900 arrives at the macro cell where the HeNB 930 is located, or UE 900 arrives at the TA of the macro cell where the HeNB 930 is located. In this case, it will be confirmed that UE 900 arrives at the area close to its HeNB 930.

In step 903, the macro eNB 920 transmits the "sounding gap response" message to UE 900. The message includes the sounding gap allocated to UE 900.

In step 904, UE 900 receives the broadcast information from HeNB 930.

In step 905, UE 900 transmits a sounding report to the macro eNB 920, including the HeNB ID length indicator or the net HeNB ID length. And the message can also include CGI, TAI and the sounding result for the UE 900.

The macro eNB 920 determines whether to perform switching according to the sounding result for the UE 900. If the macro eNB 920 determines to switch UE 900 to the HeNB cell, in step 906, it transmits the "switching request" message to MME 940 (if the switching is implemented between different MMEs, the MME is a source MME). The macro eNB 920 includes the PLMN ID and the HeNB ID in the Target ID in the message. The container of transparent transmission from source eNB to target eNB in the "switching request" message includes the CGI or CI for the target cell.

The length of HeNB GW is fixed, and the HeNB GW ID is included in the HeNB ID.

When switching between different MMEs, the source MME transmits the "forwarding relocation request" message to the target MME after receiving the "switching request" message. In subsequent embodiments, the way of the source MME finding the target MME is given. When switching between different MMEs, the MME mentioned later in present embodiment refers to the target MME.

In step 907, MME 940 transmits the "switching request" message to HeNB GW 970. According to the length of the target ID, MME 940 knows that the target eNB is not a macro eNB, and according to the length of the HeNB GW 970 (e.g., n bits), MME 940 obtains the HeNB GW ID by extracting corresponding length of bits (viz., the first n bits in HeNB) in the front of the HeNB ID. With the "S1 establishment request" message, MME 940 obtains the HeNB GW IDs of all HeNB GWs to which it connects during the process of establishing S1. MME 940 finds the target HeNB GW 970 according to the HeNB GW ID and transmits the "switching request" message to HeNB GW 970.

In step 908, HeNB GW 970 finds the HeNB 930 according to the CGI or CI in the container of transparent transmission from source eNB to target eNB. The ID for the HeNB serving cell can be allocated by HeNB GW 970. Then, it is transmitted from HeNB GW 970 to HeNB 930 with the HeNB registration process or the S1-h establishing process, as described in regard to FIG. 10. The ID for the HeNB serving cell can also be allocated by the operation and maintenance center. It is transmitted from HeNB 930 to HeNB GW 970 with the S1-h establishing process. The method for HeNB GW 970 to obtain the ID for the HeNB cell from HeNB 930 is illustrated in FIG. 9.

HeNB GW 970 can also find HeNB 930 with the HeNB ID in the Target ID.

In step 909, the subsequent operation flow of S1 switch is the same as that in existing technique.

Figure 10:
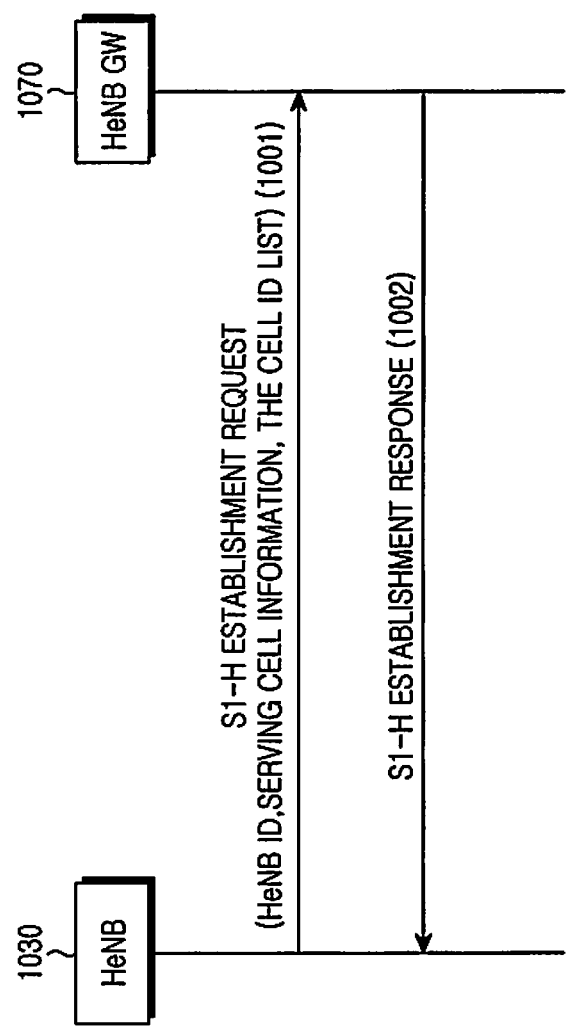
FIG. 10 shows a method for HeNB GW obtaining an HeNB serving cell ID.

FIG. 10 illustrates a method with which HeNB GW obtains the ID for the HeNB serving cell.

In step 1001, HeNB 1030 obtains the ID of the serving cell, i.e. an HeNB ID, from the operation and maintenance center. HeNB 1030 transmits the "S1-h establishment request" message to HeNB GW 1070. The message includes the HeNB ID and the serving cell ID list. Here, the cell ID can be either CGI or the unique CI under PLMN.

In step 1002, after HeNB GW 1070 receives this message, HeNB GW 1070 saves relevant information and transmits the "S1-h establishment response" message to HeNB 1030.

In above embodiments, explanation is primarily made to how the target MME finds downstream access network nodes. In configuration for HeNB, the HeNB access system will attempt connection to the MME pool shared by the macro-cell where the macro-cell is located to avoid the UE switching between different MMEs and simplifying the switching process. However, at present the possibility of relocation between different MMEs when UE switches between a macro eNB and the HeNB can not be eliminated. If two MMEs belong to different MME pools, the following methods can be adopted to make the source MME find target MME.

One method is based on TAI, and includes steps of the HeNB transmitting the ID of the TA where the HeNB cell is located; the UE obtaining the sounding gap from the macro eNB; the UE obtaining the ID of the TA where the HeNB cell is located by reading the broadcast information for the HeNB; the UE transmitting the ID of TA where the HeNB cell is located to the macro eNB when it transmits the sounding report to the macro eNB; and the macro eNB including the TAI in the Target ID in the "switching request" message, with the information elements in the Target ID for the target MME in finding the downstream nodes being described in above embodiments. The method based on TAI also includes the macro eNB determining whether to perform switching according to the sounding result for the UE. If the macro eNB determines to switch UE to HeNB cell, it transmits the "switching request" message to the source MME, and the macro eNB includes the ID of the TA where the target cell locates in the Target ID in the message. Also, the macro eNB includes the HeNB GW ID or HeNB ID in the Target ID in the message.

The method based on TAI further includes the MME storing the corresponding relationship between TAI and the MME list and the source MME finding the target MME according to the TAI. The source MME transmits the "forwarding relocation request" message to the target MME.

Solutions mentioned above can be adopted to solve the problem how target MME finds the target eNB, and subsequent operation flow of S1 switching is the same that in existing technique.

Figure 11:
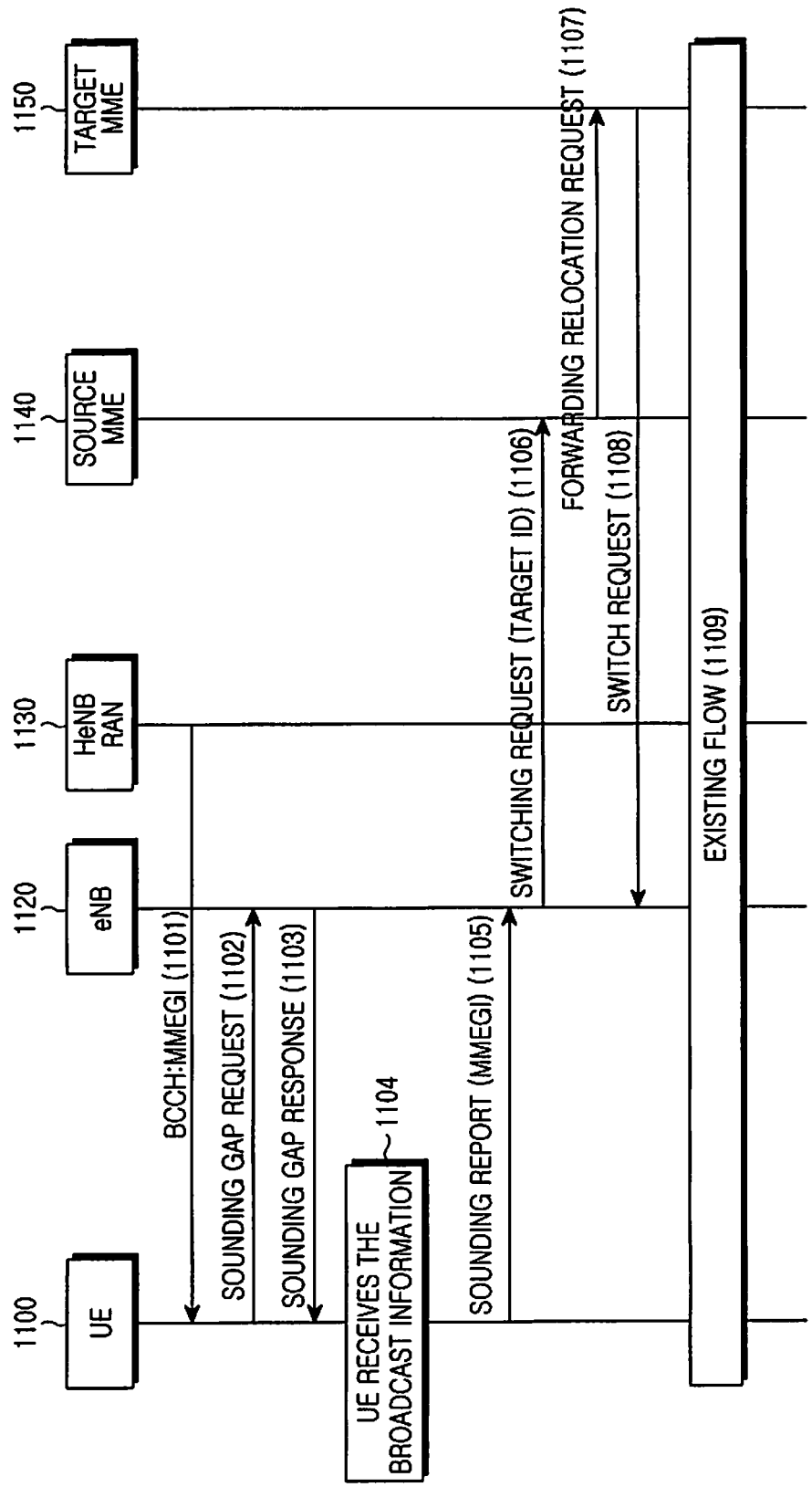
FIG. 11 shows an MME relocation process when the UE switches between the macro eNB and the HeNB.

Another method is illustrated in FIG. 11, which shows an MME relocation process when the UE switches between a macro eNB and the HeNB. The manner of how target MME finds target eNB has been described in the above embodiments, and the above solutions can be adopted to solve this problem. In this example, with a focus on how source MME finds target MME.

In this method, the HeNB access network (HeNB AN) can consist of only HeNB or HeNB and HeNB GW.

In step 1101, the eNB 1120 transmits the MME group ID (MMEGI) through the BCCH.

In step 1102, UE 1100 moves to the area close to its HeNB 1130 and requests a sounding gap from the macro eNB 1120. UE 1100 transmits the "sounding gap requesting" message to the macro eNB 1120. And according to the footprint information, UE 1100 knows that it arrives at the area close to its HeNB 1130. For example, UE arrives at the macro cell where the HeNB 1130 is located, or UE arrives at the TA of the macro cell where the HeNB 1130 is located. In this case, it will be confirmed that UE 1100 arrives at the area close to its HeNB 1130.

In step 1103, the macro eNB 1120 transmits the "sounding gap response" message to UE 1100. This message includes the sounding gap allocated to UE 1100.

In step 1104, UE 1100 receives the broadcast information from HeNB 1130.

In step 1105, UE 1100 transmits the sounding report to the macro eNB 1120, including the HeNB indicator or CSG indicator or the HeNB length indicator or the HeNB length, and CGI in the HeNB cell information. The message can also include the MMEGI of the MME that the HeNB 1130 connects to.

The macro eNB 1120 determines whether to perform switching according to the sounding result for the UE 1100. If the macro eNB 1120 determines to switch UE 1100 to the HeNB cell, in step 1106, it transmits the "switching request" message to the source MME 1140. The macro eNB 1120 includes the MMEGI of the target eNB in the message. MMEGI can also be included in the Target ID. And the macro eNB 1120 includes the PLMN ID and the HeNB GW ID or the HeNB ID in the Target ID in the message. With the "S1 establishment request" message, MME obtains the HeNB GW IDs or HeNB IDs of all HeNB GWs to which it connects during the process of establishing S1.

In step 1107, the source MME 1140 selects some default MME or any MME in the target MME pool as the target MME 1150 according to the MMEGI. The source MME 1140 transmits the "forward relocation request" message to the target MME 1150. After the target MME 1150 receives this message, it can forward this message to other MMEs in the MME pool.

In step 1108, the target MME 1150 finds the downstream node according to the PLMN ID and the HeNB ID or the HeNB GW ID in the Target ID, and then transmits the "switching request" message to its downstream node (e.g., the HeNB or the HeNB GW).

In step 1109, subsequent operation flow of S1 switch is the same as that in existing technique.

Figure 12:
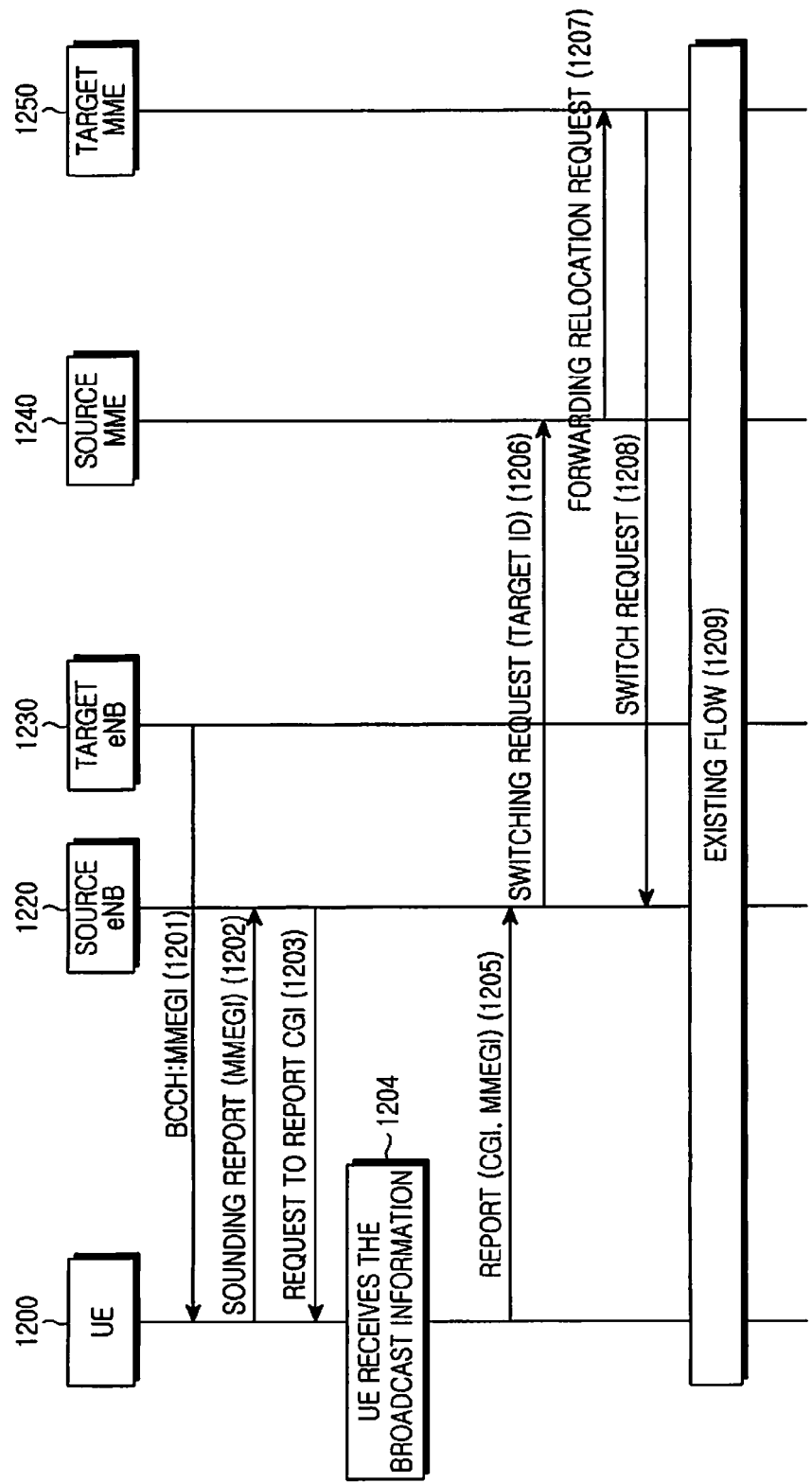
FIG. 12 shows an MME relocation process when the UE switches between one macro eNB and another macro eNB.

The MME relocation method performing S1 switch mentioned above is still suitable for the scenario that UE moves from a macro eNB to another macro eNB, as shown in FIG. 12.

In step 1201 of FIG. 12, the target eNB 1230 transmits the MME group ID (MMEGI) through BCCH.

In step 1202, UE 1200 transmits the "sounding report" message to the source eNB 1220 where it belongs and then reports the sounding result to the source eNB.

In step 1203, the source eNB 1220 detects that the information reported by UE 1200 contain none of adjacent cells, it transmits the "request to report information on some cell" message to UE 1200, requesting it to report information (like CGI) on certain cell.

In step 1204, UE 1200 receives the broadcast information "requesting to report information on a cell".

In step 1205, UE 1200 transmits the report to the source eNB 1220 it belongs to, including the CGI and the TA where the cell locates or the MMEGI of the source eNB 1220.

The source eNB 1220 determines whether to perform switching according to the sounding result for the UE 1200. If yes, in step 1206, the source eNB 1220 transmits the "switching request" message to the source MME 1240. The source eNB 1220 includes the MMEGI of the target eNB 1230 in the message. MMEGI can also be included in the Target ID. The source eNB 1220 includes the PLMN ID and the target access network node ID like the eNB ID in the Target ID in the message. With the "S1 establishment request" message, MME obtains the IDs of all access network nodes to which it connects during the process of establishing S1.

In step 1207, the source MME 1240 selects some default MME or any MME in the target MME pool as the target MME according to the MMEGI. The source MME 1240 transmits the "forwarding relocation request" message to the target MME 1250. After the target 1250 MME receives this message, it can forward this message to other MMEs in the MME pool.

In step 1208, the target MME 1250 finds the downstream node according to the PLMN ID and the eNB ID in the Target ID, and then transmits the "switching request" message to its downstream node.

In step 1209, the subsequent operation flow of S1 switching is the same as that in existing technique.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

The invention claimed is:

1. A method for performing switching between a macro evolved Node B (eNB) and a home eNB (HeNB) in a mobile communication system, the method comprising steps of:
    broadcasting, by the HeNB, a length of an HeNB Identification (HeNB ID) to a User Equipment (UE);
    notifying, by the UE, an HeNB indication information containing the length of the HeNB ID to the macro eNB;
    transmitting, by the macro eNB, a switching request message including a target ID to a mobile station Mobility Management Entity (MME); and
    finding, by the MME, the HeNB or an HeNB GateWay (GW) according to the target ID, and performing a switching process from the macro eNB to the HeNB.

2. The method according to claim 1, wherein the HeNB ID has two or three different lengths.

3. The method according to claim 1, wherein the HeNB indication information includes a global cell identifier and a sounding result of the UE.

4. The method according to claim 3, the method further comprising steps of:
    determining, by the macro eNB, whether to perform the switching process according to the sounding result; and
    transmitting, by the macro eNB, the switching request message to the MME if the macro eNB switches the UE to the HeNB.

5. The method according to claim 1, wherein the HeNB indication information includes an ID of a track area where the HeNB is located.

6. The method according to claim 1, wherein performing of the switching process comprises steps of:
    transmitting, by the MME, the switching request message to the HeNB or the HeNB GW; and
    transmitting, by the HeNB GW, the switching request message to the macro eNB if the MME transmits the switching request message to the HeNB GW.

7. An apparatus for performing switching in a mobile communication system, the apparatus comprising:
    a home evolved Node B (HeNB) broadcasting a length of an HeNB Identification (ID) to a User Equipment (UE);
    a macro eNB receiving an HeNB indication information containing the length of the HeNB ID from the UE, transmitting a switching request message including a target ID; and
    a mobile station Mobility Management Entity (MME) receiving the switching request message from the macro eNB, finding the HeNB or an HeNB gateway (GW) according to the target ID, and performing a switching process from the macro eNB to the HeNB.

8. The apparatus according to claim 7, wherein the HeNB ID has two or three different lengths.

9. The apparatus according to claim 7, wherein the HeNB indication information includes a global cell identifier and a sounding result of the UE.

10. The apparatus according to claim 9, wherein the macro eNB determines whether to perform the switching process according to the sounding result, and transmits the switching request message to the MME if the macro eNB switches the UE to the HeNB.

11. The apparatus according to claim 7, wherein the HeNB indication information includes an ID of a track area where the HeNB is located.

12. The apparatus according to claim 7, wherein the MME transmits the switching request message to the HeNB or the HeNB GW, and wherein the HeNB GW transmits the switching request message to the macro eNB if the MME transmits the switching request message to the HeNB GW.

* * * * *